(12) United States Patent
Kemeny et al.

(10) Patent No.: US 7,468,090 B2
(45) Date of Patent: Dec. 23, 2008

(54) METHOD FOR TAPPING A STEEL MAKING FURNACE

(75) Inventors: Frank L. Kemeny, Lewiston, NY (US); David I. Walker, Bolton (CA); Jeremy A. T. Jones, Lees Summit, MO (US)

(73) Assignee: Nupro Corporation, Lewiston, NY (US)

( * ) Notice: Subject to any disclaimer, the term of this patent is extended or adjusted under 35 U.S.C. 154(b) by 364 days.

(21) Appl. No.: 11/287,977

(22) Filed: Nov. 28, 2005

(65) Prior Publication Data

US 2007/0119275 A1    May 31, 2007

(51) Int. Cl.
*C21B 13/12* (2006.01)
(52) U.S. Cl. .............................. 75/375; 266/45; 266/80; 266/90
(58) Field of Classification Search ................... 266/45, 266/80, 90; 75/375
See application file for complete search history.

(56) References Cited

U.S. PATENT DOCUMENTS

| | | | | |
|---|---|---|---|---|
| 4,679,773 A | * | 7/1987 | Wunsche | 266/45 |
| 5,462,259 A | * | 10/1995 | Guido | 266/45 |
| 6,576,039 B2 | * | 6/2003 | Koffron et al. | 75/375 |
| 2004/0239017 A1 | * | 12/2004 | Heinrich | 266/240 |

* cited by examiner

*Primary Examiner*—Scott Kastler
(74) *Attorney, Agent, or Firm*—Patent Innovations LLC; John M Hammond (57) ABSTRACT

A method for tapping of steel from a steelmaking furnace to a receiving vessel comprising the steps of providing a steelmaking furnace comprising a tapping hole, and means for angular positioning of the furnace to vary the depth of molten steel and slag contained in the furnace above the tapping hole; determining a guidance profile for the tapping of the furnace, the guidance profile including the parameters of minimum tapping angle, maximum tapping angle, and time of rotation from the minimum tapping angle to the maximum tapping angle; performing an initial angular rotation of the furnace from an initial position to the minimum tapping angle; beginning the transfer of molten steel from the furnace through the tapping hole to a receiving vessel; rotating the furnace to the maximum tapping angle in accordance with the guidance profile; and ceasing the flow of molten steel through the tapping hole.

22 Claims, 5 Drawing Sheets

METHOD FOR TAPPING A STEEL MAKING FURNACE

BACKGROUND OF THE INVENTION

This invention relates in one embodiment to the tapping of steel from a steelmaking furnace, and more particularly to a method for advancing the furnace angle during tapping.

1. Field of the Invention

A method and apparatus for tapping of steel from a steelmaking furnace such as an Electric Arc Furnace (EAF) into a receiving vessel such as a ladle. The method and apparatus are directed to advancing the furnace angle during tapping to minimize the disturbance of liquids in the furnace and to minimize the amount of slag entering the ladle during tap.

2. Description of Related Art

In a primary steelmaking operation, the steel is made in the presence of a primary steelmaking slag, mostly composed of oxides of metals, including calcium, silicon, iron, magnesium, aluminum and manganese. The primary slag is "oxidizing" with respect to acceptable steel oxygen contents prior to casting, and therefore it is not suitable for further steel refining operations. It is preferable not to let this slag flow from the furnace into the ladle, since it is harmful in the next step of steel refining which is "reducing". Despite all efforts, some slag from the furnace always enters the ladle during tapping of steel. Since both the slag and the steel are molten, i.e. liquid phase materials, it is very difficult to prevent the entrainment of at least some slag in the flowing steel over the entire range of conditions that occur during tapping as the steel flows out of the tapping port.

As known in the art, attempts are usually made to eliminate primary steelmaking slag from ladle refining processes, either by retention of the primary slag in the primary steelmaking furnace as much as possible, or by raking from the surface of the steel in the ladle, or both.

Historically, steel was commonly tapped from an electric arc furnace through a tapping spout in the side of the furnace. This method resulted in substantial quantities of slag pouring from the furnace along with the steel. In U.S. Pat. No. 4,592,067, the disclosure of which is incorporated herein by reference, the inventors claim an apparatus designed to tap a furnace substantially "slag free" by replacing the tapping spout with a bottom tap hole, eccentrically placed. This and other similar arrangements have become common in the art. The eccentric bottom tap hole, or "EBT" as it is known in the art, has reduced the average amount of slag carried into the ladle from the furnace during tapping. However, in practice it has not produced the claimed result of slag free tapping. There have been improvements on this design; for example in U.S. Pat. No. 6,596,221, the disclosure of which is also incorporated herein by reference, a more complicated tap hole arrangement is described. Nevertheless, primary steel making slag is still commonly entrained into the ladle in commercial steel making facilities.

The amount of slag entering the ladle from the furnace in practice is quite variable, depending on many factors. It is known in the art, for example, that tilting the furnace backward quickly in order to terminate the tap tends to limit somewhat the slag entrainment into the ladle that happens at the end of tap. It is also known in the art that an old tap hole that has worn out to a larger inside diameter tends to entrain more slag through it during tapping than does a new tap hole of smaller inside diameter. It is also known in the art that a slag of higher temperature or more fluid physical character will more readily be entrained in the steel tapping stream and thus more slag will be carried into the ladle. The skill level of the operators that control the furnace angle during tap is also a factor that can increase or decrease the amount of slag carried from the furnace to the ladle during the tapping process.

The degree of success of the described equipment and methods in limiting slag entrainment in the flowing tapped steel is variable and unpredictable. Primary slag of varying amounts remains on the steel in the ladle when secondary refining is commenced. This is undesirable in that reagents and processing time are required to convert the primary slag to an acceptable secondary refining slag, thereby increasing the processing cost of steel making.

Accordingly, embodiments of the present invention are provided that meet at least one or more of the following objects of the present invention.

It is the object of the present invention to provide a method of tilting the steel making furnace during tapping in a way that consistently minimizes the amount of slag carry over into the ladle for any given set of process parameters and conditions.

It is a further object of this invention to provide a method of tapping the furnace that decreases the time required to tap the steel from the furnace, thereby increasing the steelmaking production rate and decreasing steelmaking cost.

It is a further object of this invention to provide a method to guide the operator in the advancement of the furnace tapping angle that is normalized to the predicted total tapping time.

It is a further object of this invention to provide an apparatus for tilting the steel making furnace during tapping in a way that consistently minimizes the amount of slag carry over into the ladle for any given set of process parameters and conditions.

SUMMARY OF THE INVENTION

In accordance with the present invention, there is provided a method for tapping of steel from a steelmaking furnace to a receiving vessel comprising the steps of providing a steelmaking furnace comprising a tapping hole, and means for angular positioning of the furnace to vary the depth of molten steel and slag contained in the furnace above the tapping hole; determining a guidance profile for the tapping of the furnace, the guidance profile including the parameters of minimum tapping angle, maximum tapping angle, and time of rotation from the minimum tapping angle to the maximum tapping angle; performing an initial angular rotation of the furnace from an initial position to the minimum tapping angle; beginning the transfer of molten steel from the furnace through the tapping hole to a receiving vessel; rotating the furnace to the maximum tapping angle in accordance with the guidance profile; and ceasing the flow of molten steel through the tapping hole.

The guidance profile may further include the parameter of a period of time following the positioning of the furnace at the maximum tapping angle, and the method further includes the step of maintaining the furnace at the maximum tapping angle for the period of time prior to ceasing the flow of molten steel through the tapping hole. The guidance profile may further include the parameter of a number of steps, and the step of rotating the furnace to the maximum tapping angle may be performed in a series of incremental steps, the time of each incremental step being the time of rotation from the minimum tapping angle to the maximum tapping angle divided by the number of steps, and the angle of each incremental step being the difference between the maximum tapping angle and the minimum tapping angle divided by the number of steps. Alternatively, the step of rotating the furnace to the maximum tapping angle may be performed in a continuous motion, the rate of change of the furnace angle being the difference between the maximum tapping angle and the minimum tapping angle divided by the time of rotation from the minimum tapping angle to the maximum tapping angle.

The furnace may further comprise means for sensing the level of the molten steel and slag above the tapping hole, and the method may further comprise the step of sensing the level of the molten steel and slag above the tapping hole and determining if the level is within acceptable limits. The level sensing means may include a camera or a microwave sensor.

The step of determining the guidance profile may include defining the guidance profile with at least one parameter obtained from a previous tapping of steel with the furnace. The parameter may be duration of time of the previous tapping with the furnace, and there may be an additional parameter of the difference in time between the two previous tappings with the furnace.

One aspect of the invention is based on the recognition of a problem that typically occurs during the tapping of steel, which involves the subjective judgment of a furnace operator. In a typical tapping operation, the operator will make a decision based on visual observations, data from process instruments, experience, and intuition whether to terminate or interrupt the tapping process because an unacceptable amount of slag is being carried over in the flowing stream. The applicants have observed that a furnace operator will typically advance the furnace angle inconsistently and unpredictably during tapping. The furnace may be advanced in large angular increments of rotation. In some instances when a temporary interruption is performed, the operator may perform a rapid tilting of the furnace backward quickly. The furnace is subsequently tilted forward again. This inconsistent operation causes several problems of varying severity.

One problem is that a wave action is formed in the molten steel and slag when high furnace rotation speed (i.e. rate of change of tapping angle), or intermittent furnace rotation with abrupt stops are prevalent. The molten steel and slag are quite prone to sloshing, since at the temperature of the tapping process, the molten steel has a kinematic viscosity on the order of that of water at room temperature (i.e. about one centistoke). The wave that occurs causes varying head over the tap hole, and causes excessive slag carry over during the period when the wave is receding from the tap hole. The steel head over the tap hole is not maximized, and more slag is entrained during the periods of low steel head over the tap hole during wave recession.

In addition, the sloshing may be exacerbated if the timing of the forward tilting occurs when the sloshing wave is near the side of the vessel opposite the tap hole. In a worst case scenario, if the operator engages in a cycle of stopping the furnace rotation for long duration, then quickly rotating forward to "catch up" with the tapping angle when he sees slag flowing through the tap hole, the sloshing wave action may be reinforced, and control of the tapping process will be further degraded due to the formation of a wave of higher amplitude, with greater entrainment of slag occurring when the wave recedes from the tap hole region of the furnace.

There is also a fear by operators of tilting the furnace too far forward, such that the molten steel and slag reaches the level of the water cooled panels in front of the tap hole area, and causes damage to them. This fear prompts a variable response from each operator depending on his/her subjective level of concern. If the wave action is particularly severe due to the stop-resumption cycling, the level of the molten steel and slag may reach an unexpectedly high level when the crest of the wave is on the tap hole side of the vessel, resulting in damage to the water cooled panels.

An additional problem in the present practice of furnace tapping is that In general, operators also do not adequately adjust the rate at which they vary the furnace angle to account for decreased tap time resulting from the increased tap hole diameter that occurs as the refractory lining of a furnace is gradually eroded.

Because a steelmaking furnace is of necessity a closed vessel, and because the interior of a steelmaking furnace is an extremely harsh environment, such vessels are not provided with means to observe or sense transient molten liquid flows and levels therein. The problem of wave action of the molten steel and slag in the vessel due to the practice of interrupting and resuming the tapping process, and its effect upon slag carryover has thus not been heretofore well understood or detected.

The applicants have discovered that the problem of wave action during tapping of a steel making furnace is significant, and that countermeasures may be taken to mitigate the effect of such wave action, and to prevent the increased carry over of slag due to the wave action. This discovery has been made by the placement of imaging means within the steel making furnace that enables real time imaging of the molten steel and slag in the furnace, and detection and observation of the wave action therein. With this wave action now able to be observed and detected, the imaging means may also be used as an element of the tapping process control system to reduce the wave action and the associated increased carry over of slag. This use of imaging means in control of the tapping process is thus another aspect of the present invention.

The method and apparatus of the present invention offer the following advantages: (1) they provide a practical way to consistently advance the steel making furnace angle that maximizes the head over the tap hole and minimizes wave action within the furnace; (2) they provide real time tap angle guidance to the tapping operator, or to the automatic tapping control system; (3) they facilitate the provision of the optimum conditions that minimize slag carry over from furnace to the ladle; and (4) they improve the safety of the furnace tapping operation. As a result of the invention, higher quality steel may be produced at a lower cost, and in a safer manner with respect to operating personnel.

It should be appreciated that although the invention is discussed in the context of tapping steel from a furnace, more particularly an eccentric bottom tap furnace, into a ladle, the invention has applicability to a wide range of material processing pouring procedures. For example, the invention is useful when tapping steel from a top blown or bottom blown basic oxygen furnace into a ladle.

BRIEF DESCRIPTION OF THE DRAWINGS

The invention will be described by reference to the following drawings, in which like numerals refer to like elements, and in which.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENTS

For a general understanding of the present invention, reference is made to the drawings. In the drawings, like reference numerals have been used throughout to designate identical elements. In describing the present invention, a variety of terms are used in the description. Standard terminology is widely used in steelmaking art.

As used herein, "tapping" is meant to indicate the transferring of liquid molten steel from a steelmaking furnace to a second vessel known as a ladle, during the steel making process.

As used herein, "slag carryover" is meant to indicate the transfer of slag in a steelmaking furnace into the second vessel, the slag either being entrained with or following after the flowing molten steel and "carried over" into the second vessel.

Figure 1:
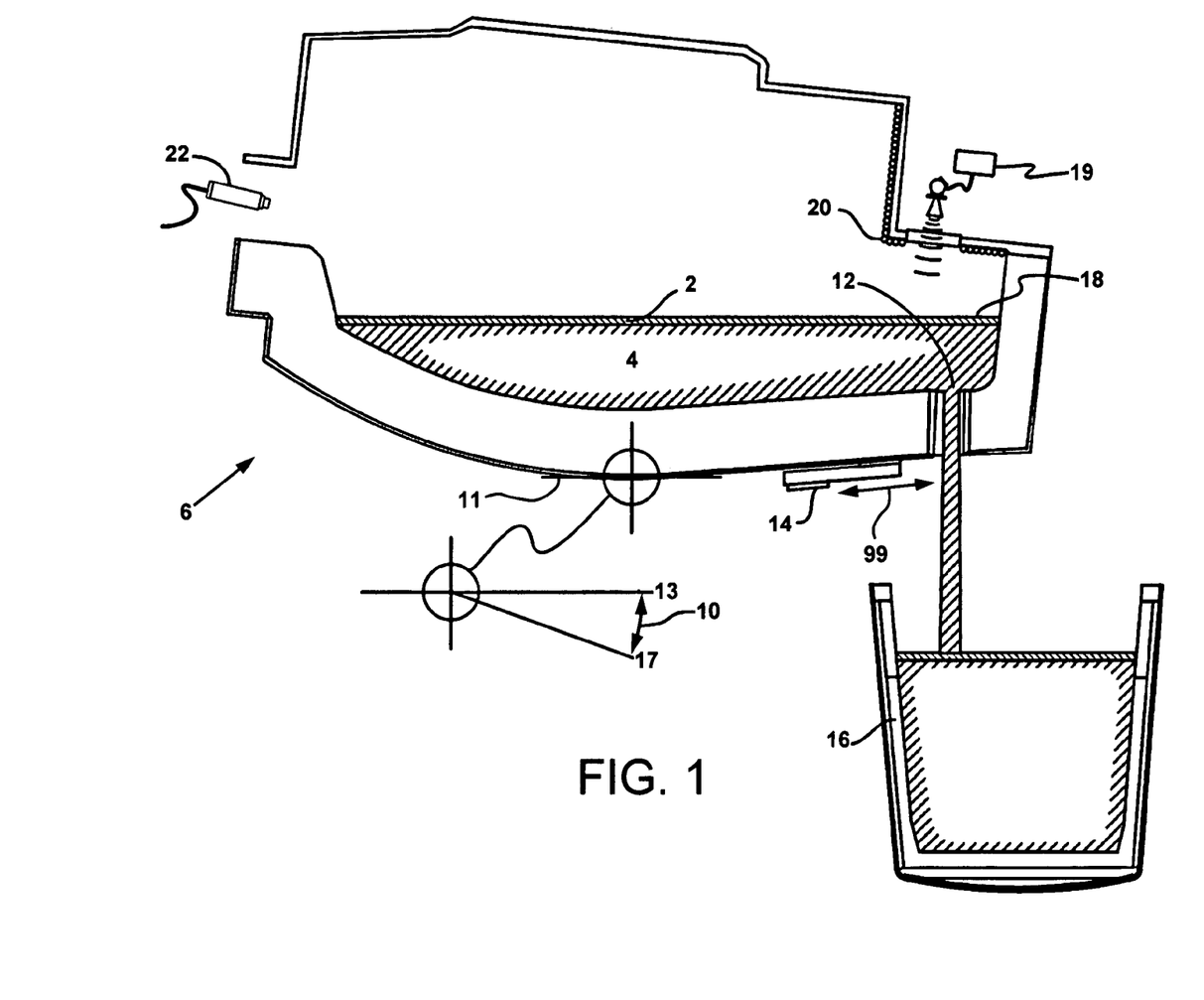
FIG. 1 is a schematic illustration of a steel making furnace operating during the tapping process, and equipped with the apparatus of the present invention.

FIG. 1 is a schematic illustration of a steel making furnace operating during the tapping process, and equipped with the apparatus of the present invention. Referring to FIG. 1, a volume of slag 2 floats on top of a volume of steel 4 within a furnace 6. The furnace 6 may be tilted over a range of angles around the horizontal position by the use of known angular positioning means (not shown) including but not limited to motors, gears, chain drives, hydraulics, and the like. The furnace angle 10 may range, for example, between about −5 degrees tilted backward, to about a maximum of 40 degrees tilted forward from the horizontal axis 11, wherein the horizontal axis 11 is defined as 0 degrees. Tap hole 12 is positioned eccentrically in the bottom of the furnace and flow through it is controlled by slide gate valve 14, through translation of the valve gate as indicated by bidirectional arrow 99.

Tapping the furnace begins by rotation of the furnace to the minimum tapping angle 13 which may vary from about 0 degrees to about 15 degrees downward from the horizontal, then opening slide gate valve 14. Steel 4 flows through tap hole 12 and past open slide gate 14 into receiving ladle 16. As the steel 4 drains from the furnace 6, the furnace angle 10 is advanced in small increments or continuously to maintain a maximum head of steel 4 over the tap hole 12 without allowing slag surface 18 to rise to a level that it may touch water cooled panel 20.

Optionally, camera 22 is disposed at a location such that it may observe the relative distance between slag surface 18 and bottom of water cooled panel 20, and that distance information is used to optimally advance the furnace angle 10 during the tapping process, that is to say to advance the furnace as much as possible toward the maximum furnace tapping angle without danger of encroachment of molten steel and slag on the water cooled panel. Optionally, microwave distance sensor 19 is disposed at a location on top of the furnace to monitor the distance between microwave sensor and the surface of the slag 18, and that distance information is used to optimally advance the furnace angle 10 during the tapping process. It will be apparent that any suitable distance sensing instrument that can sense in the atmospheric conditions that are present within the furnace would be suitable. A microwave sensor is found to be particularly suitable due to its ability to sense through the furnace refractory material, and the dust and smoke within the furnace.

Figure 2:
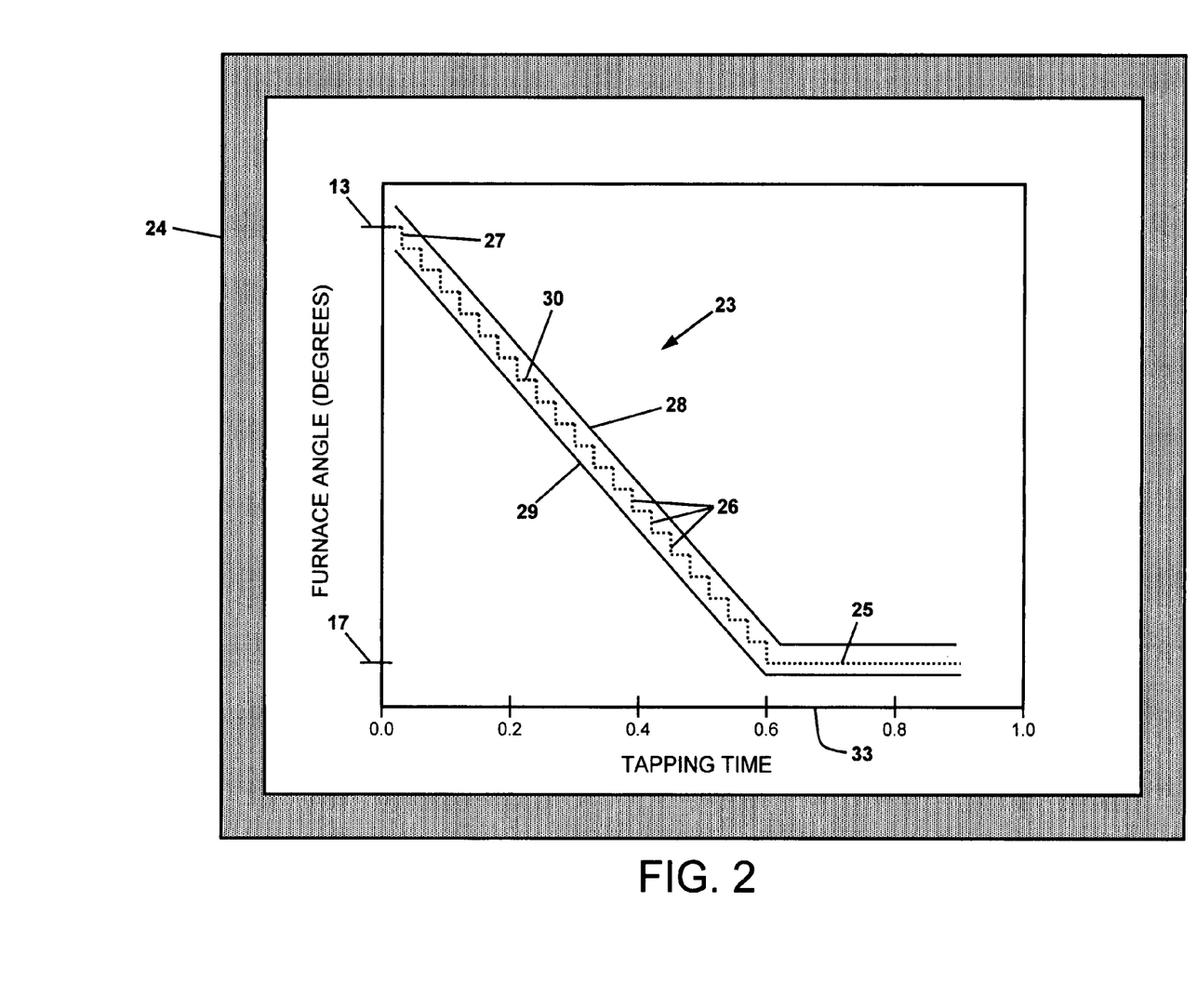
FIG. 2 is a schematic illustration of a guidance profile for furnace angle versus tapping time that is displayed on an operator interface screen and used in control of the tapping process in accordance with the present invention.

Optionally, the total tapping time is predicted by the time required to tap the previously tapped heat or by the estimated inside diameter of the tap hole 12. FIG. 2 is a schematic illustration of a guidance profile for furnace angle versus tapping time that is displayed on an operator interface screen and used in control of the tapping process in accordance with the present invention. Referring to FIG. 2, operator interface screen 24 is provided, upon which the furnace angle versus time guidance profile 23 is displayed. Guidance profile 23 is comprised of an upper limit boundary 28 and a lower limit boundary 29. Furnace tapping time is displayed on the horizontal axis 33 on a normalized scale, such that the total predicted furnace tapping time (i.e. when tapping is completed) has a value of 1.0.

The furnace angle 10 is advanced consistently from the minimum tapping angle 13 at the start of tap at time t=0 to the maximum furnace angle 17 by the operator or automatically in accordance with the guidance profile 23. The operator observes the display of the actual furnace angular position with respect to time on the interface screen, and the operator advances the angle of the furnace in small increments, so as to maintain the furnace position within the upper limit boundary 28 and the lower limit boundary 29. (In FIG. 2, the actual furnace angular position is shown for a completed tapping by dotted line 30. During the tapping operation, the actual furnace angular position indicated by dotted line 30 is rendered as tapping proceeds.)

Maximum furnace angle 17 is attained optimally from about 40 to about 90 percent of the total tapping time (i.e. from about 0.4 to about 0.9 on horizontal axis 33). The balance 25 of the tapping process occurs at the maximum furnace tapping angle 17. As described, the movement of the furnace between the time of start tapping to the time of maximum furnace rotation angle during tapping occurs either continuously or in frequent small movements such as e.g., movements 26. If the movement of the furnace is performed continuously, then this continuous rotation is at approximately constant angle change with time, i.e. the furnace motion 30 of FIG. 2 is a straight line, rather than a stepped profile. The angle change with time (i.e. the slope of guidance profile 23) is calculated by taking the maximum rotation angle 17 minus the start rotation angle 13 and dividing that difference by the number of seconds of tapping time elapsed between those events, yielding the degrees per second of rotation. In the case of frequent discrete angle changes 26, each angle change between start tapping angle 13 and maximum tapping angle 17 is preferably no more than about 2 degrees of rotation. The number of changes of rotation angle during the tapping process is at least about 10. The approximate rotation angle change of each incremental rotation 26 is calculated by the maximum rotation angle 17 minus the start tapping rotation angle 13 divided by the number of rotation angle changes during tap. It should be noted that the rotation angle changes are best not equal in order not to set up harmonic motion of liquid inside the furnace. In the event that the process is automated, and the advancement of the furnace is performed by a programmable logic controller, an algorithm may be used including a random number generator which generates the sequence of small unequal angular increments of advancement within the upper and lower limits 28 and 29.

Figure 3:
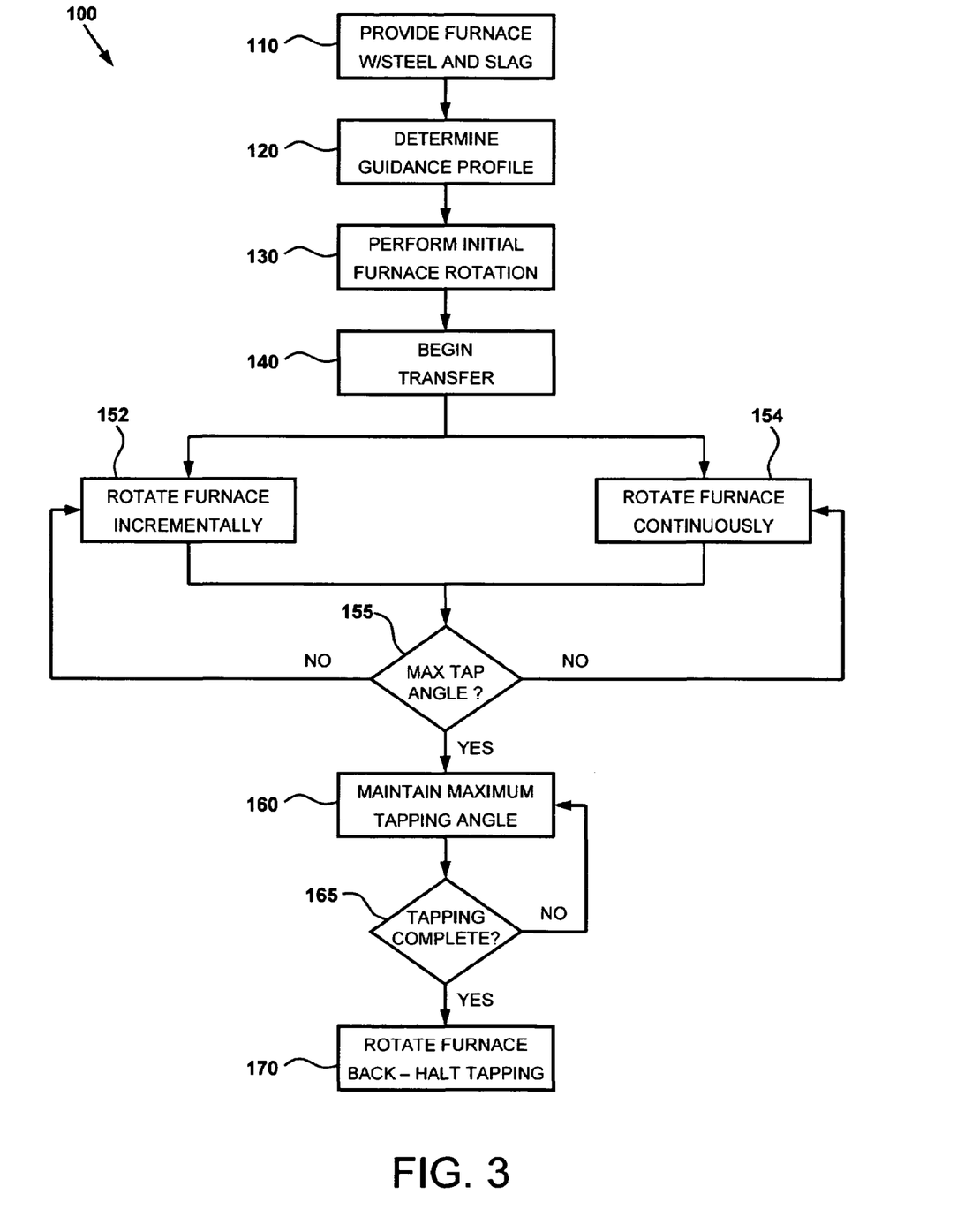
FIG. 3 is a flowchart that depicts methods for tapping a steel making furnace in accordance with the present invention.

FIG. 3 is a flowchart that depicts methods for tapping a steel making furnace in accordance with the present invention. Referring to FIG. 3 and also to FIGS. 1 and 2, the applicants' tapping methods are now described. Tapping method 100 is initiated in step 110, when a furnace such as e.g., furnace 6 is provided in which a volume of molten slag 2 is floating upon a volume of molten steel 4. Furnace 6 is comprised of a tap hole 12 through which the steel 4 is poured into receiving vessel 16. Prior to the commencement of flow of steel by opening gate valve 14, the guidance profile 23 is determined in step 120, such guidance profile including start tapping angle 13, maximum tapping angle 17, and the size and number of incremental angular rotation steps 26 or rate of angular rotation (if rotation is to be continuous), as previously described. Guidance profile 23 may be defined in advance of preparing the heat of steel 110, or guidance profile 23 may be prepared during the preparation of the heat, or immediately prior to the pouring of the steel.

With guidance profile 23 so defined, the transfer of steel may be initiated in step 130 in which the furnace 6 is rotated to the initial furnace angle 13. Subsequently, gate valve 14 is opened in step 140, and the transfer of steel from furnace 6 to receiving vessel 16 begins at time t=0. The furnace 6 is then rotated incrementally in a small angular movement 27 in step 152, with the angular movement being calculated or sensed by suitable measurement means (not shown). A determination 155 is made by an operator or by computer process control as to whether the maximum furnace tap angle 17 has been reached. If not, step 152 is repeated. If so, the furnace 6 is maintained in the position of maximum tapping angle 17 in step 160 for the balance 25 of the tapping method 100. In an alternative embodiment, furnace 6 may be continuously rotated at a predetermined speed as indicated in step 154 until the maximum tapping angle 17 is reached.

Whether the angular displacement of the furnace 6 is done in small increments, or continuously, the rotation is done in accordance with the guidance profile 23 such that the draining of the steel 4 from the furnace 6 occurs at an optimum height above the tap hole to minimize the carry over of slag into the receiving vessel 16. By performing the rotation of the furnace either continuously or in small increments, rather than in large angular advances and interruptions (as typically done by an operator) that cause sloshing of the molten steel and slag, less slag carryover occurs, and the total time for transferring the steel is reduced.

A determination 165 is made by an operator or by computer process control as to whether the tapping operation is complete, and if so, the furnace 6 is rotated back to the level position and tapping is halted in step 170. Alternatively or additionally, gate valve 14 is also closed to cease the process.

In a further embodiment, the furnace is provided with means to observe and/or sense transient molten liquid flows and levels of the slag and steel therein. Such means may be imaging means within the steel making furnace that enables real time imaging of the molten steel and slag in the furnace, and detection and observation of the steel and slag levels and flows, and any associated wave action thereof. The imaging means may include the camera 22 of FIG. 1 previously described herein, or another camera suitably positioned for capturing the liquid flows and level of the molten slag, particularly in proximity to the tap hole 12 and the water cooled panel 20. In general, any high resolution Charge Coupled Device (CCD) camera with good sensitivity in the infrared spectral region, good resolution, and a focal region located in the tap hole region of the furnace may be used for imaging within the furnace. In one embodiment (not shown), the camera is encased within a double wall enclosure that is cooled by flowing air or water. The lens of the camera may also be bathed in a flowing gas such as nitrogen, in order to keep the lens clean.

Alternatively, the means to observe and/or sense transient molten liquid flows and levels of the slag and steel therein may be comprised of a microwave distance sensor 19 (see FIG. 1) disposed at a location on top of the furnace to monitor the distance between microwave sensor and the surface of the slag 18, as described previously in this specification. One suitable microwave distance sensor for imaging the steel/slag and interior surfaces of the furnace is a Model 66 sensor manufactured by the Ohmart-Vega Corporation of Cincinnati, Ohio.

Figure 4:
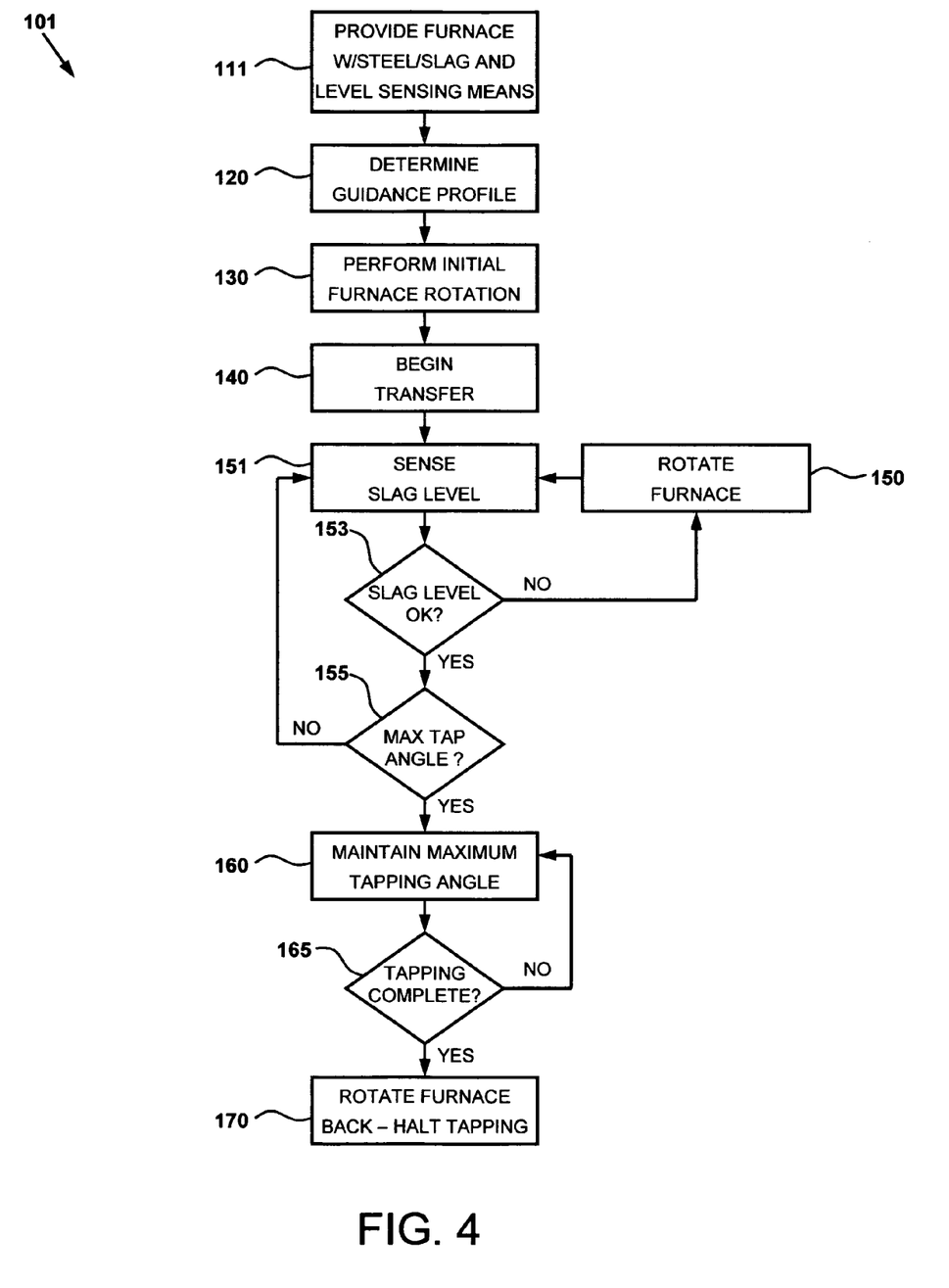
FIG. 4 is a flowchart that depicts additional enhanced method for tapping a steel making furnace in accordance with the present invention.

FIG. 4 is a flowchart that depicts additional enhanced method for tapping a steel making furnace in accordance with the present invention utilizing such means to observe and/or sense transient molten liquid flows and levels of the slag and steel therein. Referring to FIG. 4, method 101 includes many of the same steps as the previously described method 100 of FIG. 3; hence all of the steps of method 101 will not be repeated in detail. Instead, the steps of method 101 that differ from method 100 will be described.

Method 101 begins with furnace 6 being provided wherein a volume of molten slag 2 is floating upon a volume of molten steel 4, and wherein furnace 6 includes means to observe and/or sense transient molten liquid flows and levels of the slag and steel therein, such as camera 22 and/or microwave sensor 19 of FIG. 1. Method 101 proceeds through steps 120, 130, and 140, followed by step 151 in which the slag level is checked against acceptable limits using the previously described means for observing the liquid level of the slag 2 in the furnace. A determination 153 is made as to whether the slag level is acceptable ("ok"), i.e. within the acceptable range. The slag level must be a sufficient distance below the water cooled panels 20 in the furnace, and a sufficient distance above the tap hole 12 so as to not entrain slag in the steel being transferred into receiving vessel 16. If the slag level is not acceptable, step 150 of furnace rotation is performed. This rotation may be backwards, if the slag level is too high, although such a rotation is typically not necessary in the practice of the present invention. Instead, as the level of the steel 4 and slag 2 floating thereupon becomes lower, furnace rotation is stepped forward.

Following rotate furnace step 150, in step 151, the slag level is again checked against acceptable limits and determination 153 is made. If the slag level is acceptable, a determination 155 is then made as to whether the furnace has reached the maximum tap angle of rotation prescribed in the previously determined guidance profile of step 120. If not, the slag level is checked again by repeating step 151 and determination 153, and the furnace rotation step 150 is again performed if necessary. If so, steps 160, determination 165, and step 170 proceed as described previously, wherein the tapping is brought to a conclusion.

In another embodiment of the methods of the present invention, the guidance profile 23 is determined based upon historical tapping data from one or more immediately prior tappings performed with the instant furnace. In such an embodiment, it is known that the previous batch of steel was tapped through the tap hole 12 of the furnace 6 in $T_p$ seconds. It is also known that tap hole 12 wears with each batch tapped, and that it is only practical to use the tap hole 12 for about 40 to about 150 batches of steel, depending on the tap hole type and other parameters in the furnace operation. For this description the number of heats on a tap hole is deemed to be 100. It is also known that the diameter of the tap hole 12 increases in an amount that caused each prior sequential tap duration to be approximately ΔT seconds less than the previous tap duration. Therefore it may be extrapolated that the next tap duration will be $T_p-\Delta T$ seconds. It is also known that an acceptable minimum (starting) tapping angle 13 for the particular furnace is $A_{min}$, and that an acceptable maximum tapping angle 17 for the particular furnace is $A_{max}$. It is further known that following the attainment of the maximum tapping angle $A_{max}$, the tapping process may continue with the angle maintained constant for $T_{const}$ seconds.

It can therefore be calculated that the maximum tapping angle $A_{max}$ will be reached at a time of $T_{max}$ seconds wherein $$T_{max} = (T_p - \Delta T) - T_{const}$$

Additionally, on a normalized basis, the maximum tapping angle $A_{max}$ is attained at the normalized time $T_{norm}$, wherein $$T_{norm} = \frac{(T_p - \Delta T) - T_{const}}{T_p - \Delta T}$$

To obtain normalized time on a percentage basis, $T_{norm}$ is simply multiplied by 100.

If the furnace rotation is to be performed on an incremental basis in n increments, the size of an average angular increment $A_i$ is as follows:

$$A_i = \frac{A_{max} - A_{min}}{n};$$

and the duration of the average time increment $T_i$ is as follows:

$$T_i = \frac{T_{max}}{n}$$

The parameters $A_{max}$, $A_{min}$, $T_{const}$, and n, and the historical data for $T_p$ and ΔT are thus used to define a guidance profile, which is displayed on the operator interface screen for an operator to follow. Alternatively, the guidance profile may be programmed into a programmable logic controller that controls the tapping process. The operator or controller then follows this guidance profile, rotating the furnace downward at the recommended increments of time and angular displacement, with the actual tapping profile preferably being superimposed on the recommended tapping profile guidance curve, until the maximum furnace tapping angle is attained, and the tapping subsequently completed.

The following are actual examples of embodiments of the methods of the present invention, and are be considered as illustrative and not limiting with regard to such methods.

EXAMPLE 1

A batch of steel was melted in an eccentric bottom tapped electric arc furnace. After the batch was at the desired temperature and chemistry, a receiving ladle was positioned under the tap hole of the furnace. The furnace was rotated forward to an angle of 4 degrees below the horizontal plane. The sliding gate over the tap hole was opened to initiate the tapping process. The furnace was advanced forward approximately 1 degree of rotation about every 10 seconds until the maximum tapping rotation angle of 18 degrees below the horizontal plane was reached at a time of 140 seconds into the tap. The furnace was maintained in the maximum angle position for a time of 100 seconds, and the desired amount of steel was tapped into the receiving ladle at about 240 seconds of elapsed tapping time. At that time the furnace was rotated backward to about 4 degrees above the horizontal plane to stop the tapping process.

EXAMPLE 2

A batch of steel was melted in an eccentric bottom tapped electric arc furnace. After the batch was at the desired temperature and chemistry, a receiving ladle was positioned under the tap hole of the furnace. A real time image captured by a camera was displayed on the operator screen that showed the inside of the furnace, specifically the water cooled panels in front of the tap hole area and the surface of the melt within the furnace. The furnace was rotated forward by the operator until the melt surface was approximately 5 inches below the water cooled panels, resulting in a furnace rotation angle of 4 degrees below the horizontal plane. The sliding gate over the tap hole was opened to initiate the tapping process. As tapping progressed, the furnace was advanced forward incrementally by the operator about every 10 seconds, using the real time image to maintain the melt surface about 5 inches below the water cooled panels until the maximum tapping rotation angle of 18 degrees below the horizontal plane was reached at a time of 140 seconds into the tap. The desired amount of steel was tapped into the receiving ladle at about 240 seconds of elapsed tapping time. At that time the furnace was rotated backward to about 4 degrees above the horizontal plane to stop the tapping process.

EXAMPLE 3

A batch of steel was melted in an eccentric bottom tapped electric arc furnace. After the batch was at the desired temperature and chemistry, a receiving ladle was positioned under the tap hole of the furnace. The furnace was rotated forward to an angle of 6 degrees below the horizontal plane. The sliding gate over the tap hole was opened to initiate the tapping process. It was known that the previous batch of steel was tapped through this same tap hole in 280 seconds. It was known that the tap hole wears with each batch tapped, and that it was only practical to use the tap hole for 100 batches of steel. It was known that the diameter of the tap hole increased in an amount that caused each tap duration to be approximately 10 seconds less than the previous tap duration. Therefore it was expected that the then current tap duration would be 270 seconds. It was planned to rotate the furnace about 1 degree 14 times during the tap until the maximum tapping angle of 20 degrees was attained at approximately 50% of the way through the tapping process, or at approximately 135 seconds. This predicted and recommended tapping angle profile was displayed on the operator interface screen. Following this guidance curve, the operator rotated the furnace downward at the recommended increments, the actual tapping profile being superimposed on the recommended tapping profile guidance curve, until the maximum furnace tapping angle of 20 degrees down was attained. The desired amount of steel was tapped into the receiving ladle at about 270 seconds of elapsed tapping time just as predicted by the calculated recommended tapping profile. At that time the furnace was rotated backward to about 5 degrees above the horizontal plane to stop the tapping process.

In like manner, the following are prophetic examples of embodiments of the methods of the present invention, and are also to be considered as illustrative and not limiting with regard to such methods.

EXAMPLE 4

A batch of steel is melted in an eccentric bottom tapped electric arc furnace. After the batch is at the desired temperature and chemistry, a receiving ladle is positioned under the tap hole of the furnace. The furnace is rotated forward to an angle of 6 degrees below the horizontal plane. The sliding gate over the tap hole is opened to initiate the tapping process. It is known that the previous batch of steel was tapped through this same tap hole in 280 seconds. It is known that the tap hole wears with each batch tapped, and that it is only practical to use the tap hole for 100 batches of steel. It is known that the diameter of the tap hole increases in an amount that causes each tap duration to be approximately 10 seconds less than the previous tap duration. Therefore it is expected that the current tap duration will be 270 seconds. It is planned to rotate the furnace continuously at approximately constant rotation speed during the tap until the maximum tapping angle of 20 degrees is attained at approximately 50% of the way through the tapping process, or at approximately 135 seconds. Therefore, the furnace is rotated downward at a rotation speed of approximately 0.104 degrees per second. The desired amount of steel is tapped into the receiving ladle at about 270 seconds of elapsed tapping time. At that time the furnace is rotated backward to about 5 degrees above the horizontal plane to stop the tapping process.

EXAMPLE 5

Liquid iron saturated with carbon is charged into a top blown basic oxygen furnace along with scrap steel. Oxygen is blown to make a batch of liquid steel at the desired chemistry and composition. A tap hole, uncovered, is positioned in the side of the furnace at a level well above the liquid steel bath. When ready to tap the steel batch, a receiving ladle is positioned underneath the furnace. The furnace is rotated about an axis to an angle of about 80 degrees from the vertical in order to start the tapping process. From the duration of previous taps, it is estimated that the current tapping process will be 360 seconds in duration. The maximum furnace rotation angle for optimum steel drainage geometry is 104 degrees from the vertical. Therefore, the furnace is rotated 24 degrees during the tapping process. The maximum rotation angle is attained at 80% of the way through tap, or at about 288 seconds. The furnace is rotated 24 times during tap, or about 1 degree about every 12 seconds. Substantially all the steel is tapped into the receiving ladle at about 360 seconds, and it is observed at that time that slag starts to flow through the tap hole, so the furnace is rotated backward to the vertical position to stop the tapping process.

Figure 5:
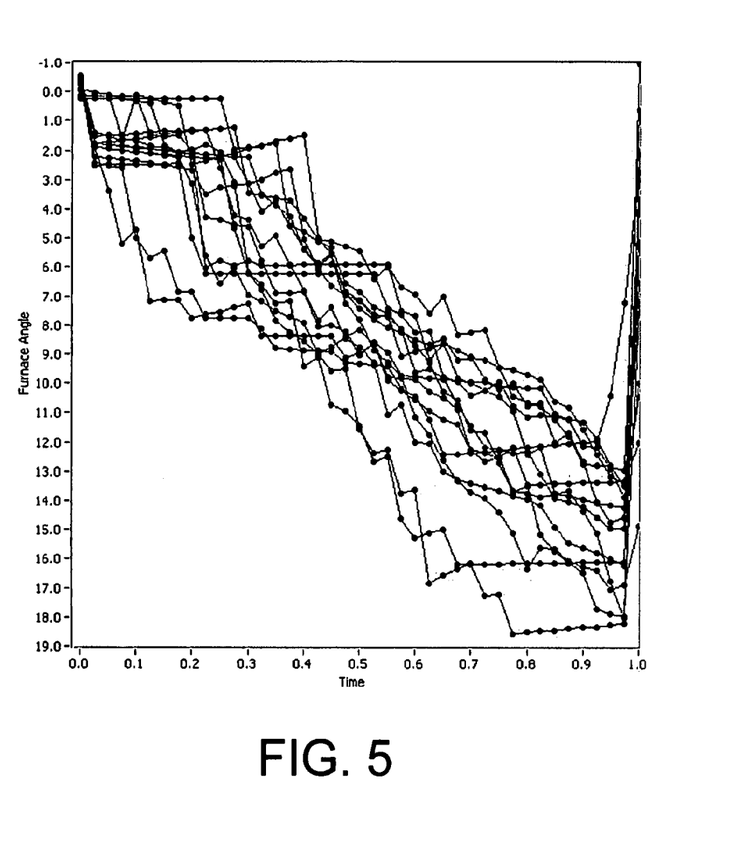
FIG. 5 is a graphical representation of furnace tapping data for a steel making furnace not equipped with the apparatus of the present invention and not operated in accordance with the methods of the present invention.
Figure 6:
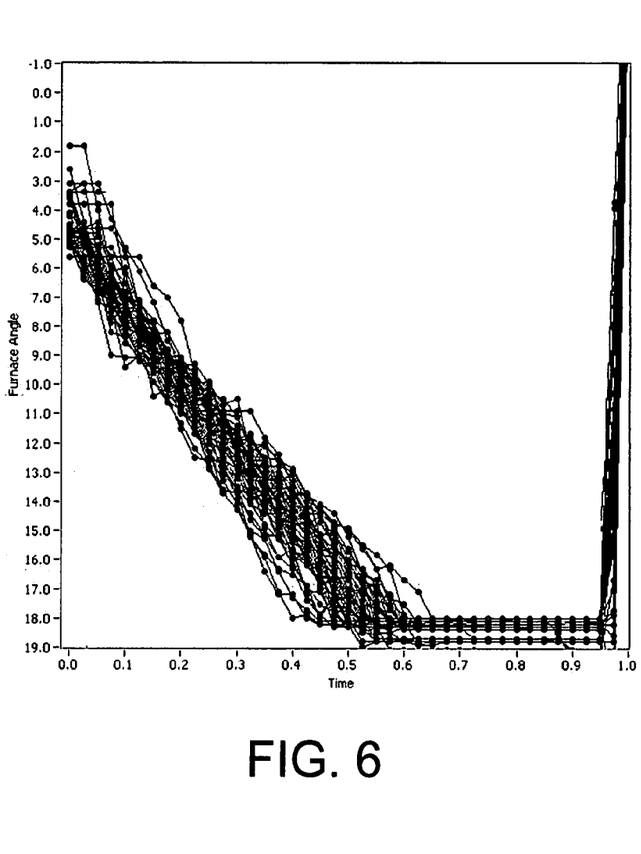
FIG. 6 is a graphical representation of furnace tapping data for a steel making furnace equipped with the apparatus of the present invention and operated in accordance with the methods of the present invention.

FIG. 5 is a graphical representation of furnace tapping data for a steel making furnace not equipped with the apparatus of the present invention and not operated in accordance with the methods of the present invention. FIG. 6 is a graphical representation of furnace tapping data for a steel making furnace equipped with the apparatus of the present invention and operated in accordance with the methods of the present invention. Referring to FIG. 5, it can be seen that the operation of the tapping process is very erratic, with the tapping angle of the furnace often being advanced forward, and then retracted backwards, and also with large incremental advances followed by periods of no advancement. Such conditions cause wave action in the molten steel and slag as previously described. In contrast, the process operation as shown in FIG. 6, for which the guidance profiles are prescribed following the procedures described herein, is done in a consistent and reproducible manner.

It is, therefore, apparent that there has been provided, in accordance with the present invention, a method and apparatus for the tapping of steel from a steel making furnace into a receiving vessel, which minimize the disturbance of liquids in the furnace and minimize the amount of slag entering the ladle during tap. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method for tapping of steel from a steelmaking furnace to a receiving vessel comprising the steps of:
   a. providing a steelmaking furnace comprising a tapping hole, and means for angular positioning of the furnace to vary the depth of molten steel and slag contained in the furnace above the tapping hole;
   b. determining a guidance profile for the tapping of the furnace, the guidance profile including the parameters of minimum tapping angle, maximum tapping angle, and time of rotation from the minimum tapping angle to the maximum tapping angle, the time of rotation being not more than 90 percent of the total time necessary to complete the tapping of the furnace;
   c. performing an initial angular rotation of the furnace from an initial position to the minimum tapping angle;
   d. beginning the transfer of molten steel from the furnace through the tapping hole to a receiving vessel;
   e. rotating the furnace to the maximum tapping angle in accordance with the guidance profile; and
   f. ceasing the flow of molten steel through the tapping hole.

2. The method as recited in claim 1, wherein the time of rotation from the minimum tapping angle to the maximum tapping angle is not more than 70 percent of the total time necessary to complete the tapping of the furnace.

3. The method as recited in claim 1, wherein the time of rotation from the minimum tapping angle to the maximum tapping angle is not more than 40 percent of the total time necessary to complete the tapping of the furnace.

4. The method as recited in claim 1, wherein the step of rotating the furnace to the maximum tapping angle is performed in a continuous motion, and the rate of change of the furnace angle is the difference between the maximum tapping angle and the minimum tapping angle divided by the time of rotation from the minimum tapping angle to the maximum tapping angle.

5. The method as recited in claim 1, wherein the furnace further comprises means for sensing the level of the molten steel and slag above the tapping hole, and the method further comprises the step of sensing the level of the molten steel and slag above the tapping hole and determining if the level is within acceptable limits.

6. The method as recited in claim 5, wherein the means for sensing the level of the molten steel and slag above the tapping hole are imaging means.

7. The method as recited in claim 6, wherein the imaging means include a camera.

8. The method as recited in claim 5, wherein the means for sensing the level of the molten steel and slag above the tapping hole include a microwave sensor.

9. The method as recited in claim 1, wherein the step of determining the guidance profile includes defining the guidance profile with at least one parameter obtained from a previous tapping of steel with the furnace.

10. The method as recited in claim 9, wherein the at least one parameter obtained from a previous tapping of steel with the furnace is the duration of time of the previous tapping with the furnace.

11. The method as recited in claim 10, wherein the guidance profile is determined based upon the difference in time between the two previous tappings with the furnace.

12. The method as recited in claim 1, wherein the step of determining the guidance profile includes defining an upper limit boundary and a lower limit boundary of the guidance profile.

13. A method for tapping of steel from a steelmaking furnace to a receiving vessel comprising the steps of:
   a. providing a steelmaking furnace comprising a tapping hole, means for sensing the level of the molten steel and slag above the tapping hole, and means for angular positioning of the furnace to vary the depth of molten steel and slag contained in the furnace above the tapping hole;
   b. determining a guidance profile for the tapping of the furnace, the guidance profile including the parameters of minimum tapping angle, maximum tapping angle, and time of rotation from the minimum tapping angle to the maximum tapping angle, the time of rotation being not more than 90 percent of the total time necessary to complete the tapping of the furnace;
   c. performing an initial angular rotation of the furnace from an initial position to the minimum tapping angle;
   d. sensing the level of the molten steel and slag above the tapping hole and determining if the level is within acceptable limits;
   e. beginning the transfer of molten steel from the furnace through the tapping hole to a receiving vessel;
   f. rotating the furnace to the maximum tapping angle in accordance with the guidance profile; and
   g. ceasing the flow of molten steel through the tapping hole.

14. The method as recited in claim 13 wherein the means for sensing the level of the molten steel and slag above the tapping hole are imaging means.

15. The method as recited in claim 14, wherein the imaging means include a camera.

16. The method as recited in claim 13, wherein the means for sensing the level of the molten steel and slag above the tapping hole include a microwave sensor.

17. The method as recited in claim 13, wherein the step of determining the guidance profile includes defining an upper limit boundary and a lower limit boundary of the guidance profile.

18. A method for tapping of steel from a steelmaking furnace to a receiving vessel comprising the steps of:
   a. providing a steelmaking furnace comprising a tapping hole, and means for angular positioning of the furnace to vary the depth of molten steel and slag contained in the furnace above the tapping hole;
   b. determining a guidance profile for the tapping of the furnace, the guidance profile including the parameters of minimum tapping angle, maximum tapping angle, time of rotation from the minimum tapping angle to the maximum tapping angle, the duration of time of the previous tapping with the furnace, and the difference in time between the two previous tappings with the furnace, the time of rotation being not more than 90 percent of the total time necessary to complete the tapping of the furnace;
   c. performing an initial angular rotation of the furnace from an initial position to the minimum tapping angle;
   d. beginning the transfer of molten steel from the furnace through the tapping hole to a receiving vessel;
   e. rotating the furnace to the maximum tapping angle in accordance with the guidance profile; and
   f. ceasing the flow of molten steel through the tapping hole.

19. The method as recited in claim 18, wherein the step of determining the guidance profile includes defining an upper limit boundary and a lower limit boundary of the guidance profile.

20. The method as recited in claim 13, wherein the step of rotating the furnace to the maximum tapping angle is temporarily interrupted following the sensing of the level of the molten steel and slag above the tapping hole.

21. The method as recited in claim 1, wherein the guidance profile further includes the parameter of a number of steps, and the step of rotating the furnace to the maximum tapping angle is performed in a series of incremental steps each having a duration and an angle, the average duration of each incremental step being the time of rotation from the minimum tapping angle to the maximum tapping angle divided by the number of steps, and the average angle of each incremental step being the difference between the maximum tapping angle and the minimum tapping angle divided by the number of steps, and wherein the angles of the incremental steps are unequal.

22. The method as recited in claim 13, wherein the guidance profile further includes the parameter of a number of steps, and the step of rotating the furnace to the maximum tapping angle is performed in a series of incremental steps each having a duration and an angle, the average duration of each incremental step being the time of rotation from the minimum tapping angle to the maximum tapping angle divided by the number of steps, and the average angle of each incremental step being the difference between the maximum tapping angle and the minimum tapping angle divided by the number of steps, and wherein the angles of the incremental steps are unequal.

* * * * *